US005601388A

United States Patent [19]

Lauterwald

[11] Patent Number: 5,601,388

[45] Date of Patent: Feb. 11, 1997

[54] TOOL HOLDER FOR A ROTARY AND/OR CHISEL HAMMER

[75] Inventor: Martin Lauterwald, Frankfurt, Germany

[73] Assignee: Black & Decker Inc., Newark, Del.

[21] Appl. No.: 400,051

[22] Filed: Feb. 16, 1995

[30] Foreign Application Priority Data

Feb. 18, 1994 [DE] Germany .......................... 44 05 697.4

[51] Int. Cl.$^{6}$ ...................................................... B23B 31/10

[52] U.S. Cl. ................................. 408/239 R; 408/239 A; 82/160

[58] Field of Search ................................. 82/74, 75, 160; 279/19, 19.2, 19.4, 19.5, 19.3, 19.1; 408/240, 238, 239 R, 239 A; 409/234

[56] References Cited

U.S. PATENT DOCUMENTS

| | | | |
|---|---|---|---|
| 4,123,074 | 10/1978 | Wanner | 279/19.5 |
| 4,434,859 | 3/1984 | Rumpp et al. | 279/19.4 X |
| 4,491,444 | 6/1985 | Rumpp et al. | 279/19.4 |
| 4,626,146 | 12/1986 | Neumaier | 408/239 R |
| 4,878,679 | 11/1989 | Plank et al. | 279/19.4 |
| 5,016,892 | 5/1991 | Lafforgue et al. | 279/19 X |

FOREIGN PATENT DOCUMENTS

| | | | |
|---|---|---|---|
| 0264880 | 2/1989 | Germany | 408/238 |
| 2096045 | 10/1982 | United Kingdom . | |
| 2171340 | 8/1986 | United Kingdom . | |

*Primary Examiner*—Daniel W. Howell
*Assistant Examiner*—Henry W. H. Tsai
*Attorney, Agent, or Firm*—Charles E. Yocum; Dennis A. Dearing; Frederick H. Voss

[57] ABSTRACT

A tool holder for a rotary and/or chisel hammer is provided with a sleeve body with a central opening for receiving a tool bit with a least one axial locking groove which is closed at both ends for engaging a cylindrical locking body which is located in a through opening in the sleeve body. The sleeve body is surrounded by a displaceable adjustment sleeve which has an area for preventing an outward radial movement of the locking body and which in a displaced position permits the radial outward movement of the at least one locking body. A ring element consisting of several ring segments is located behind the locking body and extends with a support portion into the through opening. With the movement of the locking body it can be displaced to the rear against spring pressure and in its displaced position permits a radially outward movement of the at least one locking body.

8 Claims, 3 Drawing Sheets

TOOL HOLDER FOR A ROTARY AND/OR CHISEL HAMMER

BACKGROUND OF THE INVENTION

The invention relates to a tool holder for a rotary and/or chisel hammer with a sleeve body into the central opening of which the tool bit, with its shaft provided with at least one axially extending locking groove which is closed at both ends, can be inserted from the front and in the wall of which sleeve body at least one axis-parallel through opening is provided, with a cylindrical locking body disposed in the through opening, the axial length of which is smaller than the axial length of the through opening, with an adjustment sleeve surrounding the sleeve body in the area of the through opening which can be moved against spring pressure out of a locking position, in which it prevents a radially outward movement of the locking body, which is located at the front end of the through opening and which protrudes into the central opening, into a release position, in which the locking body located at the front end of the through opening can be displaced radially outwards from the area of the central opening, wherein when the tool bit is inserted the locking body can be moved by it from the position at the front end of the through opening against spring pressure into a rear position in which it is displaced radially outwards out of the area of central opening, as well as with a support for preventing tilting movements of the locking body into blocked positions.

On a known tool holder of this type (GB Patent No 2171340) the through opening in the sleeve body which receives the cylindrical locking body continues radially outwards into an axially extending groove, which diverges outwards and into which a slide block is inserted which has a supporting surface, which, at least with the adjustment sleeve located in the locking position, over the complete axial length of the locking body rests against the outer side of its cylindrical surface and which at the rear end has a stop surface formed by a stop nose provided at the slide block which stop nose extends into the through opening. The area provided with the slide block is surrounded by a control ring which cannot be displaced axially and radially and which has control surfaces on its inner side, of which the first control surface located radially farther in when engaging with the slide block prevents its displacement and thus also the displacement of the locking body radially outwards whilst the second control surface located axially farther to the rear is located radially farther out so that the slide block with axial displacement rearwards from the area of the first control surface can move radially outwards in the area of the second control surface so that the locking body can also be displaced radially outwards and no longer protrudes into the central opening of the sleeve body. With such a position of the locking body a tool bit can be inserted and withdrawn.

The control ring is surrounded by the adjustment sleeve which can be displaced rearwards in relation to the control ring from its front locking position against the pressure of the spring acting on the slide block. With such a displacement movement a stop provided at the adjustment sleeve and extending rearwards effects a displacement of the slide block from the area of the first control surface of the control ring rearwards into the area of the second control surface so that slide block and locking body can be displaced radially outwards. In this way a tool bit located in the tool holder can be removed from the tool holder.

When a tool bit is inserted the rear end of its shaft comes into contact with the part of the front end of the locking body which protrudes inwards into the central opening of the sleeve body and displaces it and, as a result of engagement with the stop surface formed by the stop nose of the slide block with the rear end of the locking body, also displaces the slide block rearwards so that it can move out of the area of the first control surface of the control ring and the slide block and locking body can move radially outwards so that then the end of the shaft of the tool bit can slide along under the locking body which after this as a result of the spring pressure acting on the slide block can enter the locking groove in the shaft of the tool bit and can be moved forwards in the opening of the sleeve body. In this position a radial displacement of the locking body outwards is prevented by the contact of the slide block at the first control surface of the control ring.

The known tool holder is thus suitable for holding rotary and/or chisel type tool bits which are provided in their round shaft with one or more axial locking grooves which are closed at the ends as is the case for example with tool bits of the SDS system. At the same time the locking bodies enable not only a reliable holding of the tool bits in the tool holder while making it possible to have a limited axial backward and forward movement but with the provision of several of this type of locking bodies, these locking bodies can also be used for transmitting the torque for the rotary movement of the tool onto it, although generally axial ribs formed in the tool holder as known from the SDS system, which engage in the grooves of the tool shaft which are open to the rear, are used for this purpose.

As can be seen the known tool holder is composed of a large number of very specially formed individual elements so that not only the sleeve body in addition to the at least one through opening requires a groove continuing radially outwards from this but at least one very specially formed slide block and a control ring provided with various control surfaces are also required to enable the various displacement movements of the cylindrical locking body to be achieved without blocking tilting movements.

A tool holder is also known for a rotary and/or chisel hammer (GB Patent No. 2 096 045) which comprises less individual elements than the known tool holder described above. On this known tool holder which is designed to receive SDS drill bits the sole locking body consists, however, of a ball which in the locking position of the adjustment sleeve is supported against displacement radially outwards and which, when a drill bit is inserted with the displacement of a ring body against spring pressure axially rearwards in the through opening, is moved rearwards so that it can move radially outwards so as to permit the passage of the rear end of the bit shaft. In order to release an inserted drill bit the adjustment sleeve is moved out of its locking position into the release position which is effected by moving the adjustment sleeve rearwards—although this could conceivably be done by a rotational movement—so that the locking body can then be displaced radially outwards and the drill bit can be removed.

The problem of the aligned, unblocked holding of the locking body in various operating positions does not occur on this known tool holder as the locking body is spherical and not cylindrical. A spherical locking body is, however, subject to a good deal of wear as a result of the forces which occur particularly with larger rotary and chisel hammers and is thus unsuitable for this application.

SUMMARY OF THE INVENTION

The object of the invention is to provide for a tool holder which is suitable for large impact and rotary forces, which consists of a relatively small number of individual elements and which can easily be assembled.

To achieve this objective a tool holder of the type mentioned in the introduction is constructed in such a way according to the invention that an area of the adjustment sleeve in its forward position is in contact with the periphery of the locking body located at the front end of the opening, that the support comprises a ring element surrounding the sleeve body in the area of the opening which ring element consists of at least two ring segments which are connected to each other at their ends and on to which a forwards directed spring force acts, that the ring element is provided with a support portion protruding into the through opening for contact with the locking body displaced rearwards in the opening as well as with a holding portion which supports the rear end of the locking body resting against the support portion against radially outward displacement and that the front end area of the locking body is held positioned in its rearwards and radially outwards displaced position in the through opening by a support section associated with the adjustment sleeve.

In the tool holder according to the invention the cylindrical locking body is thus supported against outward displacement by an area of the adjustment sleeve, i.e. without the insertion of an additional slide block and or of a control ring not displaceable in relation to the sleeve body, whilst a ring element is provided for applying on the locking body a forward acting spring force wherein this ring element is provided for this purpose with a support portion extending into the through opening and also supports the rear end of the locking body against radial displacement outwards if the locking body is moved rearwards in the through opening. In spite of the support portion which is formed on the ring element and which extends into the through opening the ring element can easily be brought into its position surrounding the sleeve element without changes or even machining operations being necessary on the sleeve element as the ring element is formed of at lease two separate ring segments which are positioned about the sleeve body from the outside for forming the ring element in the area of the through opening so that the support portion is introduced into the through opening.

The front end area of the locking body is supported in the position in which it is displaced in the through opening rearwards as well as radially outwards by a support section associated with the adjustment sleeve so that again no component which has to be assembled separately is required for this purpose although it may be desirable to construct the adjustment sleeve from several parts, of which individual parts can be adapted as far as their material composition is concerned to the corresponding special requirements.

The front position of the ring element both with the locking body located at the front end of the through opening as also with the adjustment sleeve displaced from the front position is preferably determined by the adjustment sleeve.

The ends of the ring segments of the ring element, which preferably has a disk shape and which can be produced by punching, in a preferred embodiment are in releasable and positive engagement when assembled so that assembling can be effected by simple coupling of the ends of the ring segments and these ring segments can easily be separated from each other if the tool holder is dismantled.

If the tool holder according to the invention is provided with two through openings which have the same shape and which are diametrically opposed to each other as is desirable for rotary hammers for receiving tool bits with SDS shaft, the ring element may consist of two ring segments of the same shape, i.e. only one tool is then required for manufacturing the ring segments from which the ring elements are formed.

The support section associated with the adjustment sleeve is preferably provided with a surface section which is inclined forwards and inwards on which its outer front end area is supported with the locking body displaced rearwards and outwards from its position at the front end of the through opening. In this way the locking body upon its rearward displacement is held with its front end in a defined, radial outer position. On the other hand the inclination of the surface section, as a result of the spring tension acting via the ring element on the rear end of the locking body, produces a force component on to the front end of the locking body in the radial inwards direction. If therefore, when the locking body has been slid back, its forward end comes into the area of the locking groove of the tool bit inserted into the central opening of the sleeve body, the front end of the locking body tilts radially inwards and slides forwards under the action of the spring tension acting on the ring element so that the locking element is moved to the front end of the through opening and is held there in engagement with the locking groove of the shaft of the tool bit.

The support for the locking body may in the area between the front end of the through opening and the area of the adjustment sleeve which in its front position comes into contact with the periphery of the locking body, be provided with a spring-type support element for the outer side of the locking element. The locking element is secured against a tilting of its front end outwards into a blocked position with a spring-type support element of this type if the adjustment sleeve is moved out of its locking position into its release position, i.e. with an adjustment sleeve which can be moved in the axial direction being moved rearwards with its area which is in contact with the periphery of the locking body, in order to release a space into which the locking body can be displaced radially outwards in order to permit the removal of the tool bit from the tool holder.

In an especially preferred embodiment the spring-type support element is formed from elastically deformable material by the rear end portion of a dust protection cap which is placed on the sleeve element from the front. As a dust protection cap of this type is usual on tool holders of rotary and chisel hammers, no additional element has to be provided on this embodiment, which is used as a spring-type support element for the front end area of the locking body.

The invention will be described in greater detail below with reference to the figures which illustrate an embodiment schematically.

DETAILED DESCRIPTION OF THE INVENTION

Figure 1:
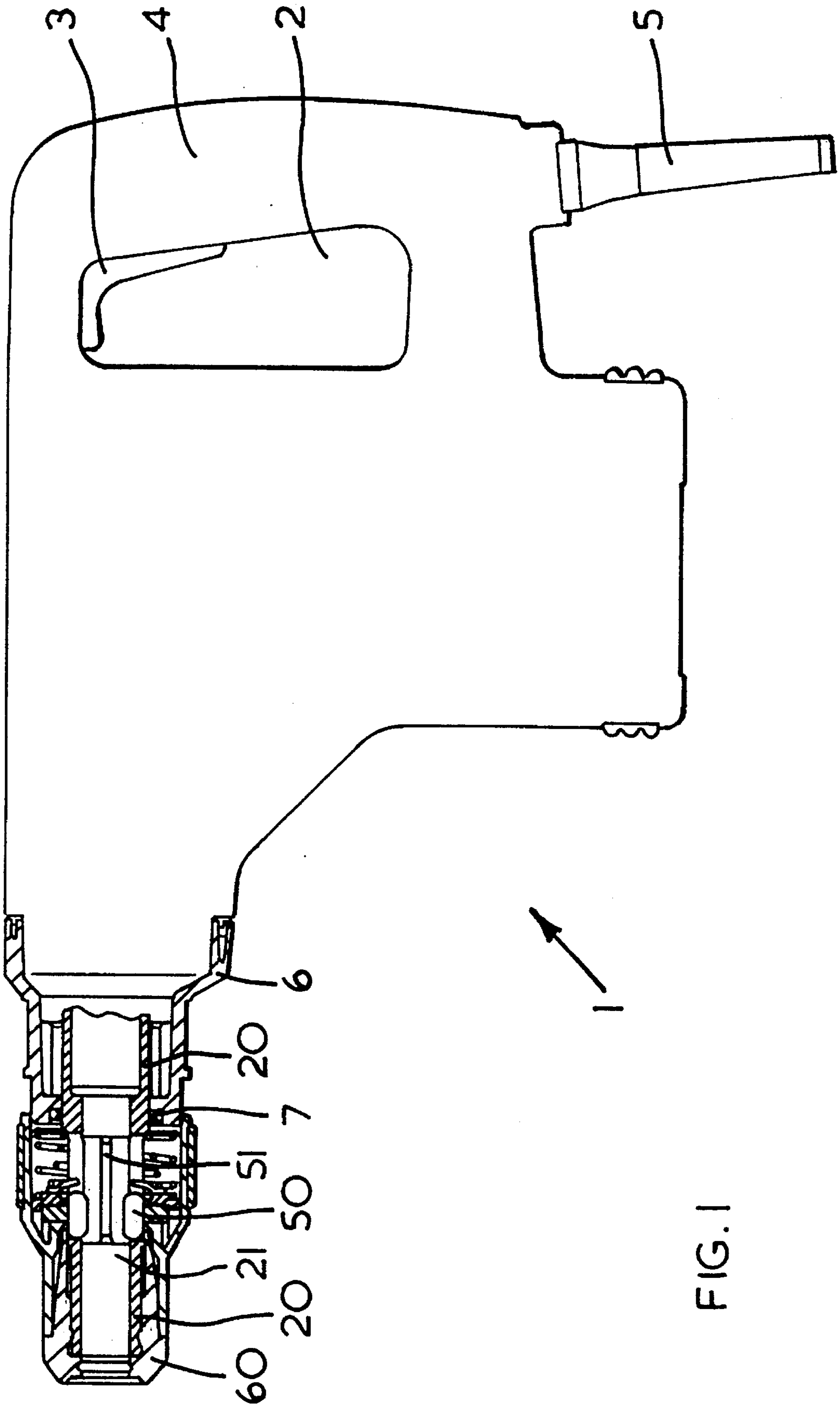
FIG. 1 shows a side and part sectional view of a rotary hammer.

The rotary hammer 1 which is shown schematically in FIG. 1 has a housing which is provided with a handle opening 2 by means of which the housing forms a handle portion 4 and into which a trigger element 3 extends in the normal way for the switch by means of which the electric motor (not shown) forming the drive is actuated. The electrical supply cable is run through the partially illustrated support sleeve 5 into the housing of the rotary hammer 1. The rotary hammer 1 can be provided with a pneumatic hammer mechanism which is usual in rotary hammers presently on the market as well as with a rotary drive for the tool holder shown in section in FIG. 1. A corresponding structure is shown for example in GB Patent No 1 576 795.

Figure 2:
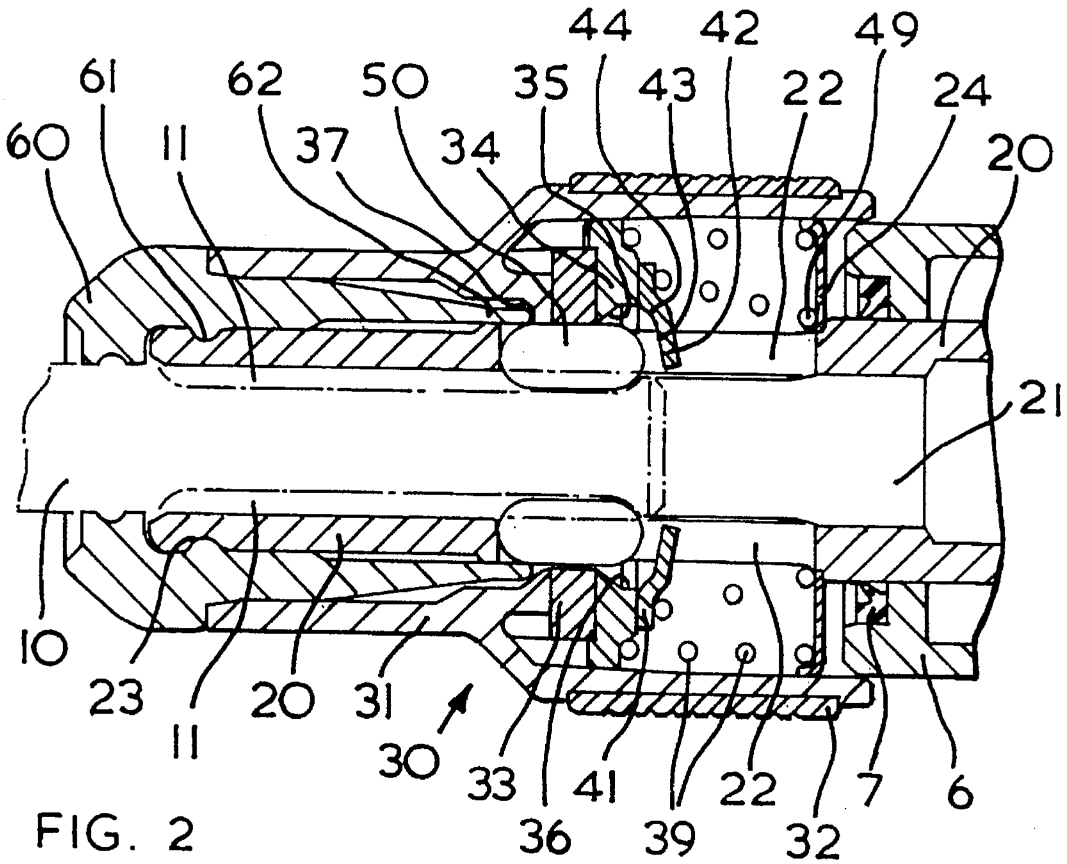
FIG. 2 shows a sectional view of the tool holder of the rotary hammer of FIG. 1 with the adjustment sleeve located in the locking position and the locking elements which are held by this against radial outward displacement.
Figure 3:
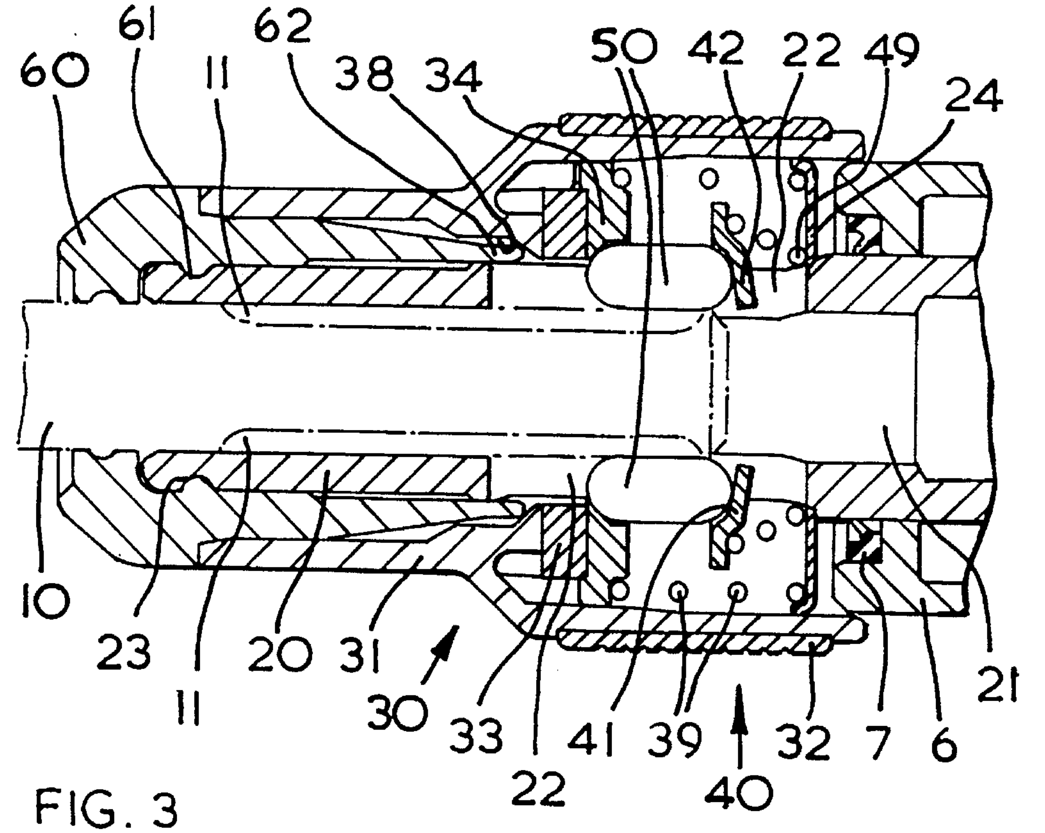
FIG. 3 shows a representation according to FIG. 2 of the operating position with locking elements moved rearwards by the insertion of a tool bit.
Figure 4:
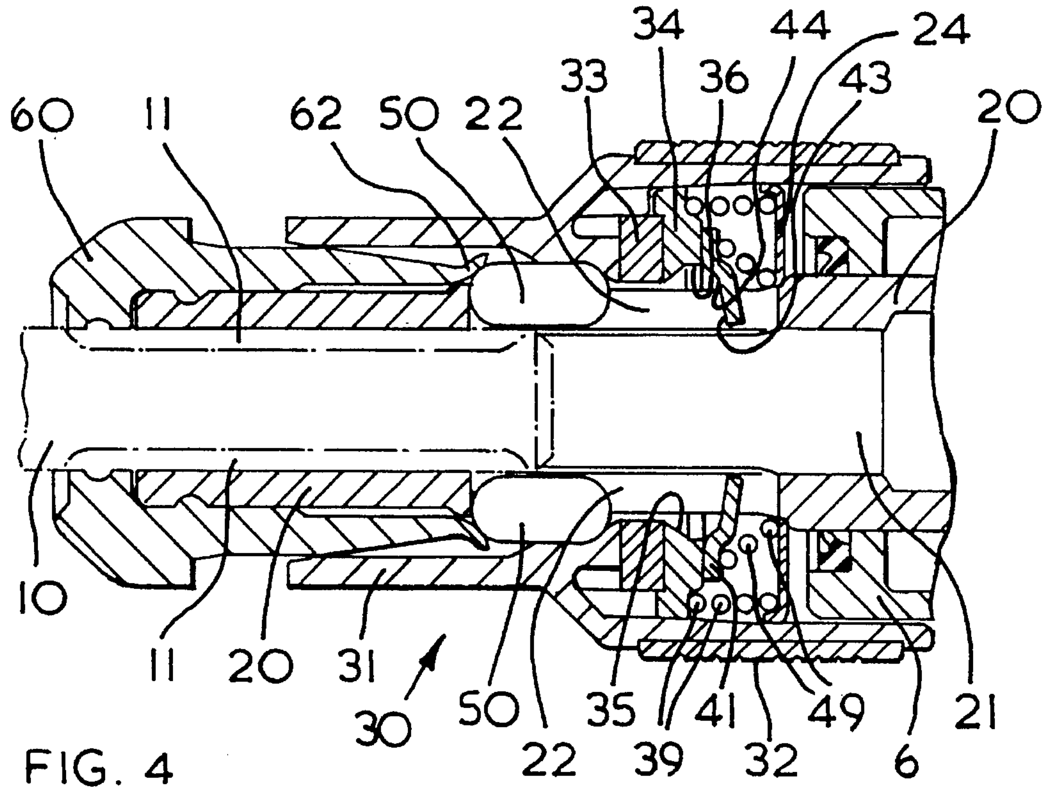
FIG. 4 shows a representation according to FIGS. 2 and 3 of the operating position with the adjustment sleeve moved into the release position and locking elements moved radially outwards.

The tool holder shown in section in FIG. 1 and shown in detail in FIGS. 2 to 4 has a sleeve body 20 which for example can be formed in one piece with the spindle (not shown) which can be driven in rotation, and which has a central opening 21 which is open in the forward direction. In the rear portion of the sleeve body 20 a seal lying against the outer surface of the sleeve body 20 is provided which is held in a housing element 6 which, as shown in FIG. 1, is secured at the front end of the housing of the rotary hammer 1.

The tool holder shown is suitable for an SDS bit 10, i.e. a tool bit which is provided is its shaft with at least one and preferably two axis-parallel locking grooves 11 which are closed at both ends and which can be located opposite each other as well as with at least one and preferably at least two axis-parallel drive grooves which are open at the rear end of the shaft. With the tool bit inserted in the tool holder axis-parallel drive ribs 51 (FIG. 1) formed at the inner surface of the central opening 21 of the sleeve body 20 engage in the drive grooves so as to transmit the torque from the sleeve body 20 driven in the rotational direction to the tool bit 10. The roller-shaped or cylindrical locking bodies 50 are in engagement with the locking grooves 11 in a manner to be described and these locking bodies 50 secure the tool bit 10 against falling out of the central opening 21 of the sleeve body 20 and at the same time permit a limited axial forward and backward movement of the tool bit 10, on the rear end of which impacts produced by the hammer mechanism of the rotary hammer 1 are transmitted in the known manner.

The roller-shaped locking bodies 50 are inserted into axis-parallel through openings 22 in the sleeve body 20 which are opposite each other and the length of which is greater in the illustrated embodiment greater than double the length of the locking body 50. The cross sectional shape of the through openings 22 in this arrangement has been chosen in the known manner so that portions of the locking bodies 50 can protrude into the central opening 21 of the sleeve body 20 but the locking bodies 50 cannot fall through into the central opening 21 if the drill bit 10 is missing, i.e the locking bodies 50 can only be displaced into a radially inner end position in the through openings 22, in which a portion of them protrudes into the central opening 21 of the sleeve body 20.

As can be seen particularly in FIGS. 2 to 4, an adjustment sleeve 30 is located on the sleeve body 20, which has a plastic body 31, into which a support ring 33 made of steel as well as adjacent to this an abutment ring 34 are pressed. A grip ring 32 is located in the rear area on the outer side of the plastic body 31. A pressure spring 39 in the form of a coil spring is supported on a rearwards—directed ring-shaped surface of the abutment ring 34 and the other end of this pressure spring rests against a support disk 24 which is disposed rigidly on the sleeve body 20 so that a forwards directed spring tension acts on the adjustment sleeve 30 with this spring tension loading the adjustment sleeve 30 in the direction of its position in accordance with FIGS. 2 and 3.

The outer portion of a ring element 40 rests against a rearwards directed, radial inner surface of the abutment ring 34 in the positions in accordance with FIGS. 2 and 4 so that to this ring element a forward-directed spring tension is applied by a truncated cone shaped pressure spring 49 which is also supported at the support disk 24 although radially farther in than the pressure spring 39. Support portions 42 which extend radially inwards into the through openings 22 are formed at the ring element 40 and these support portions 42 do not protrude into the central opening 21 of the sleeve body 20 and are provided in the transition to the outer ring portion with a surface forming a holding portion 44 which runs obliquely forwards and outwards.

Figure 5:
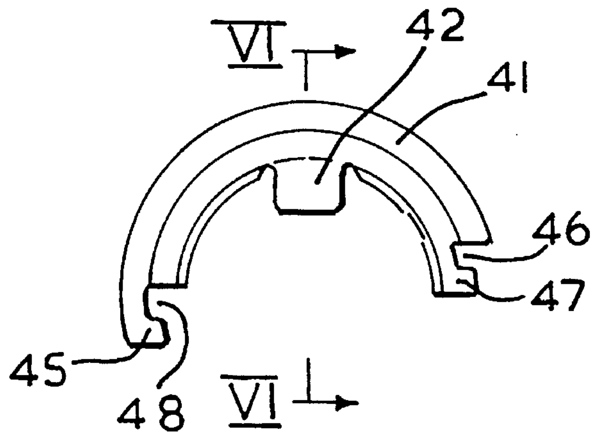
FIG. 5 shows a view of a ring section for forming a disk-shaped ring element.
Figure 6:
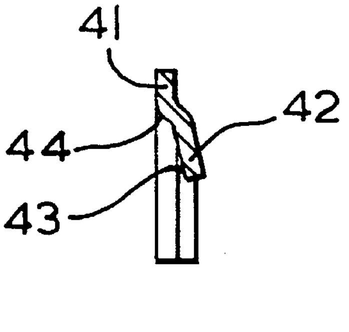
FIG. 6 shows a section along the line VI—VI of FIG. 5.

As shown in FIGS. 5 and 6, the ring element 40 consists of two ring segments 41 which have the same shapes and which at one end are provided with a first recess 46 which is open outwards and a protrusion 47 adjacent to it and at the other end with a second recess 48 which is open inwards and a protrusion 45 adjacent to it.

The dimensions of the protrusion 47 fit into the second recess 48 and those of the protrusion 45 fit into the first recess 46 so that the ring element 40 is formed by the positive engagement of two equally shaped ring segments 41. In this way two ring segments 41 can be placed about the sleeve body 20, before the adjustment sleeve 30 is placed on it, and with their support portions 42 brought into engagement with the through openings 22 so that the positive engagement of the ends of the ring segments 41 cause an alignment and positioning for forming the ring element 40.

For assembling the locking bodies 50 are thus first of all inserted in the through openings 22 of the tool holder shown. The pressure spring 49 can then be moved on to the sleeve body 20 from the front whereafter the ring segments 41 with their support portions 42 inserted into the through openings 22 are placed about the sleeve body 20 and brought with their ends into positive engagement in the manner described above. After this the coil spring 39 and the adjustment sleeve 30 can be moved from the front on to the sleeve body and to fix this arrangement the dust protection cap 60 consisting of deformable plastics material is then pressed on to the front end of the sleeve body 20. The dust protection cap 60 is provided with an inward directed annular rib 61 which engages in an annular groove 23 of the sleeve body 20 so that the dust protection cap 60 is held on the sleeve body 20 in a positioned but releasable manner. A radially outer located annular shoulder of the dust protection cap 60 limits the displacement movement of the adjustment sleeve 30 in the forward direction and thus defines its forward end position.

As can be seen in FIGS. 2 to 4 the dust protection cap 60 extends between sleeve body 20 and plastic body 31 of the adjustment sleeve 30 rearwards into the front area of the through openings 22. In this area the elastically deformable rear end portion 62 of the dust protection cap 60 surrounds the front area of the through openings 22.

If no tool bit 10 is inserted into the tool holder and if the adjustment sleeve 30 is not moved by the operator, the arrangement in accordance with FIG. 2 is obtained (without the indicated tool bit 10), i.e. the adjustment sleeve 30 is pressed by the pressure spring 39 into its front end position, in which it rests against the outer annular shoulder of the dust protection cap 60 and the ring element 40 is supported by the action of the pressure spring 49 at the abutment ring 34 of the adjustment sleeve 30. The locking bodies 50 are located at the front ends of the through openings 22 between their front end wall and the associated support portion 42 of the ring element 40 and they are held by the inner peripheral surface of the support ring 33 of the adjustment sleeve 30 in a radially inner position, in which they protrude into the central opening 21 of the sleeve body 20.

If the operator inserts a tool bit 10 into the central opening 21 and at the same time brings its drive grooves which are not shown and which are open towards the rear into engagement with the drive ribs 51 (FIG. 1) of the sleeve body 20, i.e. aligns the bit shaft in relation to these drive ribs and in relation to the locking bodies 50, during the continuation of the introduction movement the rear end of the bit shaft comes into contact with the front end of the portions of the locking bodies 50 which extend into the central opening 21 of the sleeve body 20. In this way the locking bodies 50 are moved in the rearward direction in the through openings 22 so that they come into contact with the surfaces 43 of the support portions 42 of the ring element 40 which are facing them and so that they also displace the ring element 40 against the force of the pressure spring 49 in the rearward direction as indicated in FIG. 3. With this displacement movement the holding portions 44 which are inclined forwards and outwards in the transition from the surfaces 43 to the outer periphery of the ring element 40, support the locking bodies 50 against a movement of their rear ends farther radially outwards after a radially outward tilting of the rear ends of the locking bodies 50 has occurred. When the axial movement of the locking bodies 50 in the rearward direction takes place, their outer peripheries slide along the inwardly facing ring surface of the support ring 33 until the front end areas of the locking bodies 50 come into the area of the abutment ring 34. This ring is provided on its radially inner side extending from the support ring 33 with a rearward and outward inclined surface 35 which passes into a ring surface 36. With a further movement of the locking bodies 50 in the rearward direction, their front ends thus slide along the inclined surface 35 radially outwards and are supported against further outward movement by the following ring surface 36, i.e. the locking bodies 50 come into the position according to FIG. 3, in which they are held by the ring surface 36 and the associated holding area 40 parallel to the middle axis of the central opening 21 of the sleeve body 20 and outside this central opening 21. Consequently the rear end of the shaft of the tool bit 10 can slide along the locking bodies 50, the front ends of which then tilt radially inwards as is not shown in FIG. 3 as a result of the inclination of the surface 35 of the abutment ring 34 and of the force of the spring 49 acting on their rear ends as soon as they reach into the area of the locking grooves 11 of the tool bit 10 and are no longer adequately supported by its rear end. This displacement movement of the front ends of the locking bodies 50 radially inwards permits the movement of the locking bodies 50 through the force of the spring 49 forwards beneath the inwardly facing surface of the support ring 33 and thus into the position according to FIG. 2, in which, as indicated, the locking elements 50 are in engagement with the locking grooves 11 of the drill bit 10 and are prevented by the support ring 33 from moving radially outwards from the locking grooves 11. The tool bit 10 is thus located in the tool holder in its drilling and impact position.

To release the drill bit from the tool holder the adjustment sleeve 30 is, by using the grip ring 32, moved to the rear against the force of the pressure spring 39 out of the position according to FIG. 2 so that as a result of the contact of the ring element 40 at the abutment ring 34 the ring element 40 together with the adjustment ring 30 is moved to the rear by overcoming the force of the pressure spring 49. In this way the support ring 33 slides to the rear along the outer side of the locking elements 50 whilst a tilting of the front ends of the locking elements 50 radially outwards is prevented by the rear end portion 62 of the dust cap 60. As can be seen particularly in FIGS. 2 and 3, to the front a radial outward and forward inclined support surface 37 follows the support ring 33 in the plastic body 31 of the adjustment sleeve 30 which support surface 37 passes over into a ring surface 38 which has substantially the same radial distance from the middle axis of the central opening 21 as the ring surface 36 at the abutment ring 34.

When the adjustment sleeve 30 is pushed to the rear to the extent that the support ring 33 is located behind the locking bodies 50 (FIG. 4) the withdrawal of the drill bit 10 from the central opening 21 in the forward direction causes the locking bodies 50 to be pressed radially outwards as a result of the engagement of the rear limiting areas of the locking grooves 11 of the bit shaft with the locking bodies 50 so that they are moved from the area of the central opening 21 of the sleeve body 20 outwards into contact with the ring surface 38 of the plastic body 31 of the adjustment sleeve 30 with the result that with the elastic deformation of the rear end portion 62 of the dust cap 60 the outer front ends are supported by this rear end portion and are prevented from being subjected to a further outward tilting movement. With the locking elements 50 thus located in the position according to FIG. 4 the drill bit 10 can be removed.

As soon as the drill bit 10 has been moved out of the area of the locking elements 50, the elastically deformable rear end portion 62 of the dust cap 60 presser the front end of the locking bodies 50 again radially inwards and with the release of the adjustment sleeve 30 the pressure springs 39 and 49 move it again forwards so that the outer rear ends of the locking bodies 50 are pressed radially inwards along the support 37 if the locking bodies 50 have not already been moved by gravity into their radially inner position in the through openings 22. The further forwards movement of the adjustment sleeve 30 is then limited at the outer annular shoulder of the dust cap 60 so that the operating position results which is shown in FIG. 2 without a drill bit 10 being inserted in the central opening 21 of the sleeve body 20.

I claim:

1. A tool holder for rotary and chisel hammers comprising:

a sleeve body having front and rear ends and a central opening and axis for receiving the tool;

at least two axis parallel openings within said sleeve body;

at least two roller-shaped locking bodies which partially protrude through the axis parallel opening when the tool is locked in said sleeve, wherein said at least two locking bodies are displaceable between a locked position and an unlocked position;

an adjustment sleeve surrounding said sleeve body and biased in a forward direction, wherein said adjustment sleeve is moveable between forward and rear positions, such that movement of said adjustment sleeve forward locks said locking bodies and movement of said adjustment sleeve to the rear unlocks said locking bodies;

a resiliently deformable cap connected to the front of said sleeve body, which acts to define the maximum forward movement of said adjustment sleeve;

an abutment ring connected to and surrounded by said adjustment sleeve;

a support ring adjacent to said abutment ring and surrounded by said adjustment sleeve, such that said support ring contacts said at least one locking body when said locking body is in its locked position; and a ring element including two ring segments and located about said sleeve body, wherein said ring element is biased in a forward direction and said locking bodies contact and displace said ring segments in a rearward direction when the tool is inserted.

2. The tool holder as recited in claim 1, further comprising:

a spring disposed at the rear side of said abutment ring which biases said abutment ring and said adjustment sleeve in a forward direction; and a second spring disposed at the rear of said ring segments of said ring element to bias them in a forward direction.

3. The tool holder as recited in claim 1, wherein said locking bodies are of equal shape and diametrically opposed.

4. The tool holder as recited in claim 1, wherein said ring element has the shape of a disk.

5. The tool holder as recited in claim 2, further comprising a support disk located towards the rear of the tool holder which anchors both said first and second springs.

6. The tool holder as recited in claim 1, wherein said ring segments have matching recess and protrusions which are mated together to form said ring element.

7. The tool holder as recited in claim 5, wherein said ring segments have support portions which extend radially inwards into said axis parallel openings to support said locking bodies.

8. The tool holder as recited in claim 7, wherein said locking bodies lock and unlock by radially extending and retracting through said axis parallel openings.

* * * * *